Figure 1:
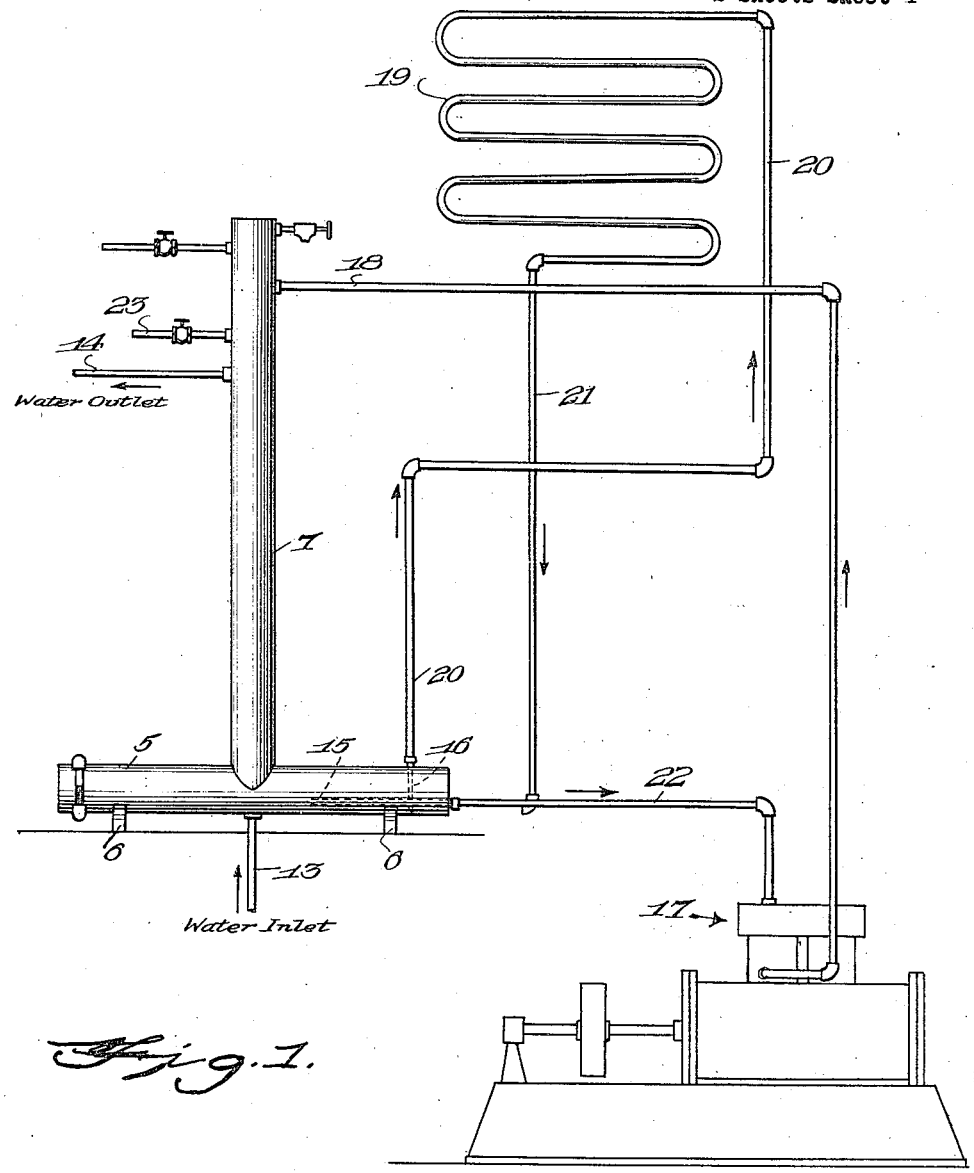

June 12, 1923.
H. W. WOLFE
REFRIGERATING APPARATUS
Filed Oct. 26, 1921
1,458,899
2 Sheets-Sheet 2
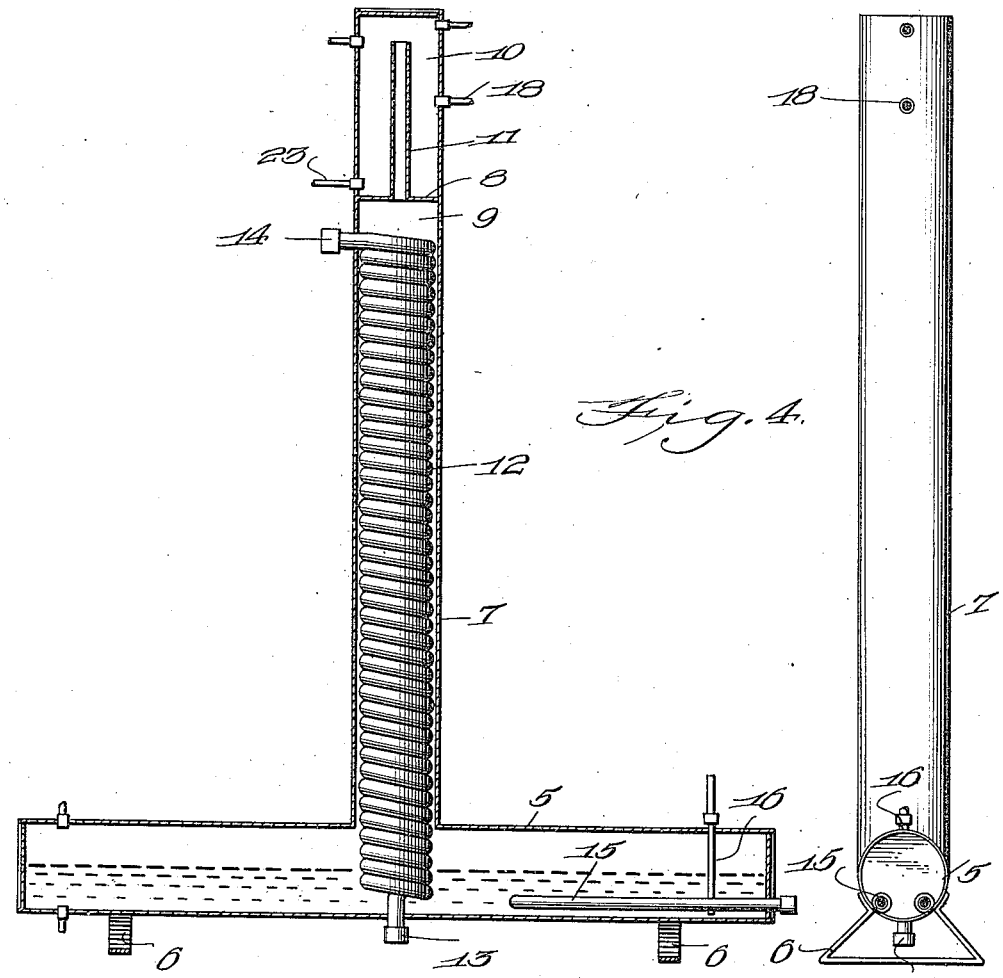

Patented June 12, 1923.

1,458,899

UNITED STATES PATENT OFFICE.

HARRY W. WOLFE, OF PHILADELPHIA, PENNSYLVANIA.

REFRIGERATING APPARATUS.

Application filed October 26, 1921. Serial No. 510,461.

*To all whom it may concern:*

Be it known that I, HARRY W. WOLFE, a citizen of the United States, residing at Philadelphia, in the county of Philadelphia and State of Pennsylvania, have invented certain new and useful Improvements in Refrigerating Apparatus, of which the following is a specification.

The present invention relates more particularly to apparatus for separating oil from the gas, condensing the ammonia gas, and providing means for pre-cooling the ammonia after it has passed through the refrigerating member and prior to its introduction into the separator and condenser.

An embodiment of the invention is illustrated in the accompanying drawings, wherein:—

Figure 1 is a diagrammatic view of a refrigerating system, showing the improved apparatus in place therein, Figure 2 is a sectional view on an enlarged scale through the improved apparatus, Figure 3 is a plan view of the same, Figure 4 is an end elevation.

In the embodiment disclosed, an elongated and horizontally disposed ammonia reservoir 5, preferably cylindrical in form is carried by suitable supports 6, and rising from the central portion thereof, is a vertical cylindrical tower 7 that opens at its lower end into the said reservoir. In the upper portion of this tower is a partition 8 forming a lower condensing chamber 9 and an upper separating chamber 10. The partition supports an open ended stand pipe 11 that thus affords communication between the upper end of the chamber 10 and the upper end of the chamber 9. A coil 12 for containing a cooling or condensing agent is located longitudinally in the chamber 9 and extends downwardly into the reservoir 5. The lower end 13 of this coil constitutes the intake and the upper end 14 the outlet therefor. Located in the lower portion of the reservoir 5 is a pre-cooling coil 15, and a liquid outlet pipe 16, passing through the top of the reservoir 5, extends to a point close to the bottom thereof.

The preferred form of system is outlined in Figure 1, the compressor being shown at 17, and having its discharge connected to a pipe 18 leading to the separating chamber 10 below the top of the stand pipe 11. A refrigerating coil or member is shown at 19, its inlet being connected by a pipe 20 to the pipe 16, its outlet being connected to one end of the pre-cooling coil 19 by a pipe 21, the other end of said pre-cooling coil being connected by a pipe 22 to the intake of the compressor.

In this system the liquid ammonia is withdrawn from the reservoir 5 and passes through the refrigerating coil 19. It is then directed by the pipe 21 through the precooling coil 15 where any liquid contained will assist in cooling the ammonia in the reservoir 5. The gas then passes through the compressor and is delivered into the chamber 10. Here any oil will be deposited, while the gas will pass downwardly through the stand pipe 11. The oil will be maintained in liquid condition by resting upon the partition 8, which is cooled by the chamber below and may be withdrawn through a suitable draw-off pipe 23. The gas passing downwardly through the chamber 9 will contact with the coil and be condensed into liquid that will find its way into the reservoir 5, and thus be in condition to be passed again through the system.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is;

1. In apparatus of the character set forth, the combination with a hollow base, of a condensing tower mounted thereon and having an open bottom in open communication with the upper portion of the base, means for subjecting the tower to the action of a cooling medium, an oil separating chamber, and a stand pipe connecting the upper portion of the separating chamber with the upper portion of the condensing tower.

2. In apparatus of the character set forth, the combination with a condensing tower having a condensing chamber and a separator chamber above the condensing chamber, a standpipe affording communication between the upper portion of the separating chamber and the upper portion of the condensing chamber, an extended hollow base forming a liquid reservoir that communicates with the lower end of the condenser chamber, and a cooling coil located in the condensing chamber.

3. In apparatus of the character set forth, the combination with a substantially horizontal tubular liquid reservoir, of a vertical tubular tower supported therein and in communication therewith, a transverse partition in the upper portion of the tower, forming an upper separating chamber and a lower condensing chamber, a standpipe affording communication between the upper portions of the chambers, and a condensing coil located in the condensing chamber and extending into the liquid reservoir.

4. In apparatus of the character set forth, the combination with a hollow base constituting a liquid reservoir, of a condensing tower mounted on the base and having an open lower end communicating therewith, and means for holding a cooling medium located in the tower and extending through the lower open end into the reservoir.

5. In apparatus of the character set forth, the combination with a hollow base constituting a liquid reservoir, of a condensing tower mounted on the base and having an open lower end communicating therewith, means for holding a cooling medium located in the tower and extending through the lower open end into the reservoir, and an oil separating chamber having communication between its upper end and the upper end of the condensing tower.

6. In apparatus of the character set forth, the combination with an elongated tubular base constituting a liquid reservoir, of a condensing tower upstanding from an intermediate portion of the base and having an open lower end in communication therewith, means in the tower and extending into the reservoir for passing a cooling liquid therethrough, an oil separator chamber having communication between its upper portion and the upper portion of the condensing tower, and a pre-cooler located in the lower portion of the liquid reservoir.

In testimony whereof, I affix my signature in the presence of two witnesses.

HARRY W. WOLFE.

Witnesses:
C. F. FRANK,
D. M. DINKELMAN.